(12) United States Patent
Hwang et al.

(10) Patent No.: US 8,107,765 B2
(45) Date of Patent: Jan. 31, 2012

(54) BLOCK-BASED IMAGE RESTORATION SYSTEM AND METHOD

(75) Inventors: Kyu Young Hwang, Gyeonggi-do (KR); Ho Young Lee, Gyeonggi-do (KR); Du-Sik Park, Gyeonggi-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1014 days.

(21) Appl. No.: 12/035,583

(22) Filed: Feb. 22, 2008

(65) Prior Publication Data

US 2009/0116763 A1   May 7, 2009

(30) Foreign Application Priority Data

Nov. 2, 2007 (KR) .................. 10-2007-0111716

(51) Int. Cl.
*G06K 9/40* (2006.01)
*G06K 9/00* (2006.01)
*H04N 1/407* (2006.01)
*H04N 7/12* (2006.01)

(52) U.S. Cl. ....... 382/275; 382/167; 382/266; 358/3.27; 375/240.27

(58) Field of Classification Search .................. 382/162, 382/167, 173, 254, 260–270, 274–276, 280, 382/298–300, 304–305, 312; 358/1.2, 3.15, 358/3.27, 447, 463, 518, 525; 375/240.18, 375/240.19, 240.27
See application file for complete search history.

(56) References Cited

U.S. PATENT DOCUMENTS

| 5,191,406 | A  | * | 3/1993  | Brandestini et al. ......... 348/111 |
| 6,046,768 | A  | * | 4/2000  | Kaneda et al. ............. 348/208.2 |
| 6,453,068 | B1 | * | 9/2002  | Li ................................. 382/167 |
| 6,614,944 | B1 | * | 9/2003  | Levantovsky ................ 382/261 |
| 7,663,779 | B2 | * | 2/2010  | Nagao et al. ................... 358/1.2 |
| 2002/0140854 | A1 |   | 10/2002 | Lan |

FOREIGN PATENT DOCUMENTS

| KR | 10-2001-0049039 | 6/2001 |
| KR | 10-2003-0097814 | 12/2003 |
| KR | 10-2004-0096763 | 11/2004 |
| KR | 10-2005-0049856 | 5/2005 |
| KR | 10-2006-0014879 | 2/2006 |

* cited by examiner

*Primary Examiner* — Kanjibhai Patel
(74) *Attorney, Agent, or Firm* — Staas and Halsey LLP

(57) ABSTRACT

A block-based image restoration system and method is provided. The image restoration system, including: an edge processing unit to perform a color shifting in an edge of an image and process the edge of the image; a restoration parameter extraction unit to segment the image into at least one domain and extract a restoration parameter for each block included in the segmented domain; and an image restoration unit to apply a block-based transform domain filtering according to the restoration parameter and perform an image restoration.

21 Claims, 8 Drawing Sheets

BLOCK-BASED IMAGE RESTORATION SYSTEM AND METHOD

CROSS-REFERENCE TO RELATED APPLICATION

This application claims the benefit of Korean Patent Application No. 2007-111716, filed in the Korean Intellectual Property Office on Nov. 2, 2007, the disclosure of which is incorporated herein by reference.

BACKGROUND OF THE INVENTION

1. Field of the Invention

Aspects of the present invention relate to a block-based image restoration system and method, and more particularly, to a block-based image restoration system and method which can restore a high-frequency domain loss occurring when enhancing a resolution of an image and emphasize details of the image.

2. Description of the Related Art

An image display device being developed to embody a big screen and a high resolution image and image contents needs to be improved for a higher resolution image. Particularly, as the use of scalers increase along with the development of image technologies, a low resolution image needs to be converted into a high resolution image. For example, a low resolution image such as a standard definition (SD) or high definition (HD) image needs to be converted into a high resolution image such as a full HD or ultra definition (UD) image.

An image scaler is used when converting a low resolution image into a high resolution image. However, since an image scaler enhances an image resolution based on interpolation, a high frequency domain of an image, particularly, an edge of an object, is lost and details of an image can not be graphically represented.

In particular, a loss in a high frequency domain of an image is a blur occurring in an edge of an object. Blur includes blur which occurs when obtaining an image, and blur which occurs due to an interpolation performed by a scaler.

An image restoration operation is needed to remove the blur caused by a high frequency domain loss. An image restoration apparatus in a conventional art removes blur without considering a feature of an image domain to restore a high frequency component of image. Accordingly, a visual unity is lacking. In a super high-resolution image, an image feature for each domain is to be considered due to a large-sized screen, since image data itself spatially changes.

Thus, a new image restoration system and method is needed.

SUMMARY OF THE INVENTION

Aspects of the present invention provide an image restoration system and method which processes an edge of an image, removes a ringing component of the edge of the image, and thereby can perform an image restoration without degrading an image quality, enhance an image resolution when restoring the image, and improve an image restoration performance.

Aspects of the present invention also provides an image restoration system and method which extracts a restoration parameter for each block, restores an image considering global restoration information about an entire image, and thereby can perform an image restoration more rapidly and prevent a blocking artifact from occurring.

Aspects of the present invention also provides an image restoration system and method which can efficiently remove blur occurring due to an enhancement of an image resolution through a Fourier transform domain filtering, prevent a noise from occurring through a wavelet transform domain filtering, and enhance an image resolution.

According to an aspect of the present invention, there is provided an image restoration system, including: an edge processing unit to perform a color shifting in an edge of an image and process the edge of the image; a restoration parameter extraction unit to segment the image into at least one domain and extract a restoration parameter for each block included in the segmented domain; and an image restoration unit to apply a block-based transform domain filtering according to the restoration parameter and perform an image restoration.

According to an aspect of the present invention, the restoration parameter extraction unit can extract a blur value and a noise removal threshold value of each of the blocks using an analysis result with respect to a spatial activity of each of the blocks.

According to an aspect of the present invention, the restoration parameter extraction unit can extract the restoration parameter based on global restoration information about the entire image and local restoration information about each of the blocks.

According to an aspect of the present invention, the image restoration unit can apply a Fourier transform domain filtering and a wavelet transform domain filtering of each of the blocks using the restoration parameter.

According to another aspect of the present invention, there is provided an image restoration method, including: performing a color shifting in an edge of an image and processing the edge of the image; segmenting the image into at least one domain and extracting a restoration parameter for each block included in the segmented domain; and applying a block-based transform domain filtering according to the restoration parameter and performing an image restoration.

According to an aspect of the present invention, the processing increases a signal bandwidth of any one of an object color and a background color of the image and removes a ringing component of the edge of the image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

Figure 1:
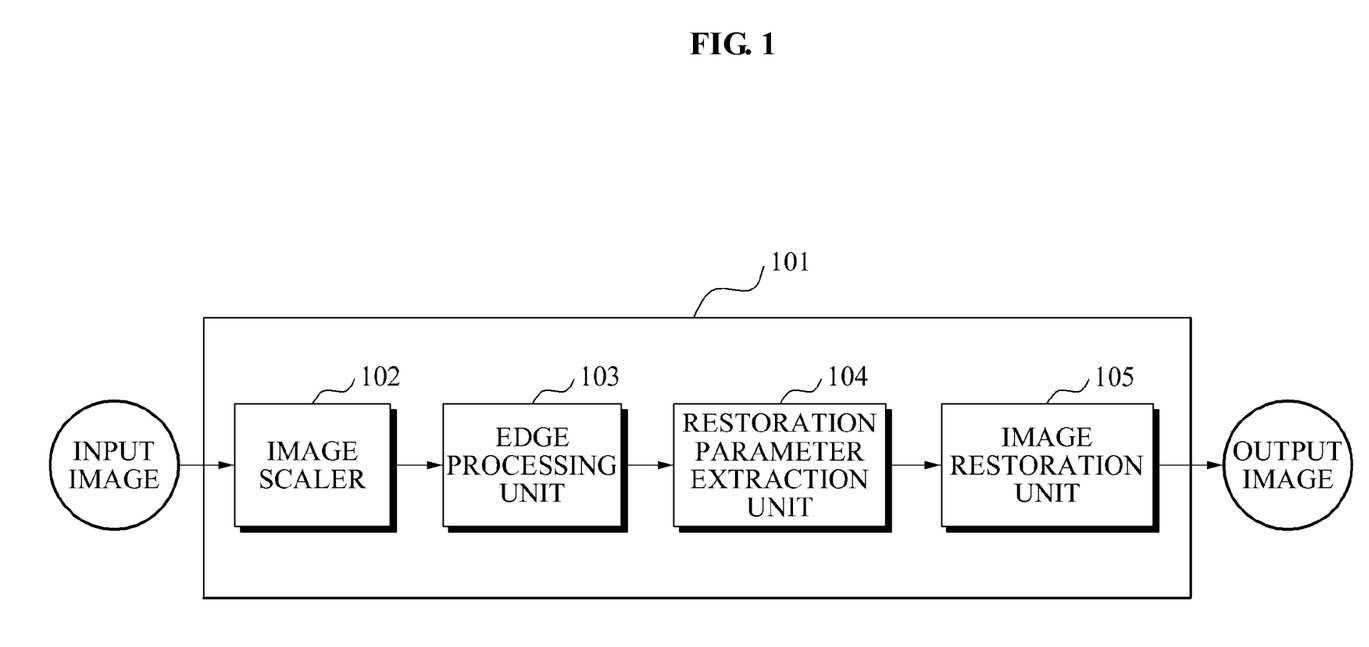
FIG. 1 illustrates a configuration of an image restoration system according to an embodiment of the present invention.

FIG. 1 illustrates a configuration of an image restoration system 101 according to an embodiment of the present invention.

Referring to FIG. 1, the image restoration system 101 can include an image scaler 102, an edge processing unit 103, a restoration parameter extraction unit 104, and an image restoration unit 105.

The image scaler 102 upsamples an image, interpolates the upsampled image, and thereby can enhance a resolution of the image. Particularly, the image scaler 102 can be used when converting a low resolution image to a high resolution image.

For example, the image scaler 102 can upsample the image using zero data and interpolate the upsampled image through a low-pass filter. Specifically, the image scaler 102 can increase a size of the image by inputting the zero data, and remove an unnecessary component using the interpolation. That is, the image scaler 102 can enhance the resolution of the image based on the interpolation.

However, when enhancing the resolution of the image using only the image scaler 102, a blur with respect to an entire image can detrimentally occur. In this instance, the blur can include blur which occurs when obtaining an image, and blur which occurs due to the interpolation performed by the image scaler 102. The blur can be represented as a point spread function of the blur. Since the point spread function has a form of a low-pass filter, a noise component can be controlled as blur of the image increases. In this instance, since the noise component is independent of an image signal, the blur of the image can be predicted using a noise distribution value.

The image scaler 102 can use the low-pass filter when interpolating. Accordingly, a high frequency component of the image, for example, the edge of the image, can be lost, and a resolution of the image can be deteriorated due to the loss of the edge. Particularly, when converting the image into a super high resolution image such as an ultra definition (UD) image, the loss of the high frequency component can be significant since a resolution enhancement magnification is high. Accordingly, the image restoration system 101 restores the loss of the high frequency component occurring when enhancing the image resolution, and thereby can appropriately enhance the image resolution.

The edge processing unit 103 can perform a color shifting in the edge of the image and process the edge of the image. In this instance, the image is the resolution-enhanced image by the image scaler 102. For example, the edge processing unit 103 can increase a signal bandwidth of any one of an object color and a background color of the image and remove a ringing component of the edge of the image. In this instance, the ringing component is generated between an object edge and a background edge, and can be caused by the blur occurring when enhancing the image resolution by the image scaler 102.

The image restoration system 101 can restore the image by emphasizing the high frequency component of the resolution-enhanced image. In this instance, when the ringing component exists in the edge of the image and the high frequency component is emphasized, the ringing component is enhanced as well. Accordingly, an image quality can be degraded. According to an embodiment of the present invention, the edge processing unit 103 processes the edge of the image by removing the ringing component existing in the edge of the image, and thereby can improve an image restoration performance. That is, the edge processing unit 103 designates a color of the ringing component as the object color or the background color, and thereby can remove the ringing component. An operation of the edge processing unit 103 is described in greater detail with reference to FIGS. 2 and 3.

The restoration parameter extraction unit 104 can segment the image into at least one domain and extract a restoration parameter for each block included in the segmented domain. The restoration parameter is independently extracted for each of the segmented domains, and a number of the segmented domains is not limited. When the image is enhanced to the UD resolution, extracting the restoration parameter with respect to the entire image by the restoration parameter extraction unit 104 can be inefficient since image data is huge. Accordingly, the restoration parameter extraction unit 104 can extract the restoration parameter for each block included in the segmented domain.

For example, the restoration parameter extraction unit 104 can extract a blur value and a noise removal threshold value of each of the blocks using an analysis result with respect to a spatial activity of each of the blocks. Since an image such as a super high resolution image has different characteristics for each domain, extracting a different restoration parameter for each domain can be more efficient than extracting an identical restoration parameter with respect to the entire image in order to restore the image. Accordingly, the restoration parameter extraction unit 104 can extract the blur value and the noise removal threshold value of each of the blocks.

In a case of the high resolution image, a blocking artifact can occur due to an excessive difference between the restoration parameters among each of the blocks. Accordingly, for example, the restoration parameter extraction unit 104 can extract the restoration parameter based on global restoration information about the entire image and local restoration information about each of the blocks. The restoration parameter extraction unit 104 is described in greater detail with reference to FIGS. 4 and 5.

The image restoration unit 105 can apply a block-based transform domain filtering according to the restoration parameter and perform a restoration with respect to the resolution-enhanced image. For example, the image restoration unit 105 can apply a Fourier transform domain filtering and a wavelet transform domain filtering for each of the blocks using the restoration parameter.

For example, the image restoration unit 105 can remove blur by applying the Fourier transform domain filtering. That is, the image restoration unit 105 can perform an inverse transform of a function with respect to the blur value through the Fourier transform domain filtering to efficiently remove blur. However, although the blur removal can be efficiently performed through the Fourier transform domain filtering, a noise boost(amplification of noise) can occur.

According to an embodiment of the present invention, the image restoration unit 105 applies the Fourier transform domain filtering and the wavelet transform domain filtering, and thereby can remove a noise with respect to the resolution-enhanced image and enhance the image resolution.

However, in the case of the high resolution image, a processing speed can be reduced when applying the transform domain filtering in series. Accordingly, for example, the image restoration unit 105 applies the Fourier transform domain filtering using the blur value and the wavelet transform domain filtering using the noise removal threshold value in parallel considering a filtering process for each of the segmented domains, and thereby can perform the image restoration more rapidly. The Fourier transform domain filtering and the wavelet transform domain filtering are described in greater detail with reference to FIGS. 6 and 7.

Figure 2:
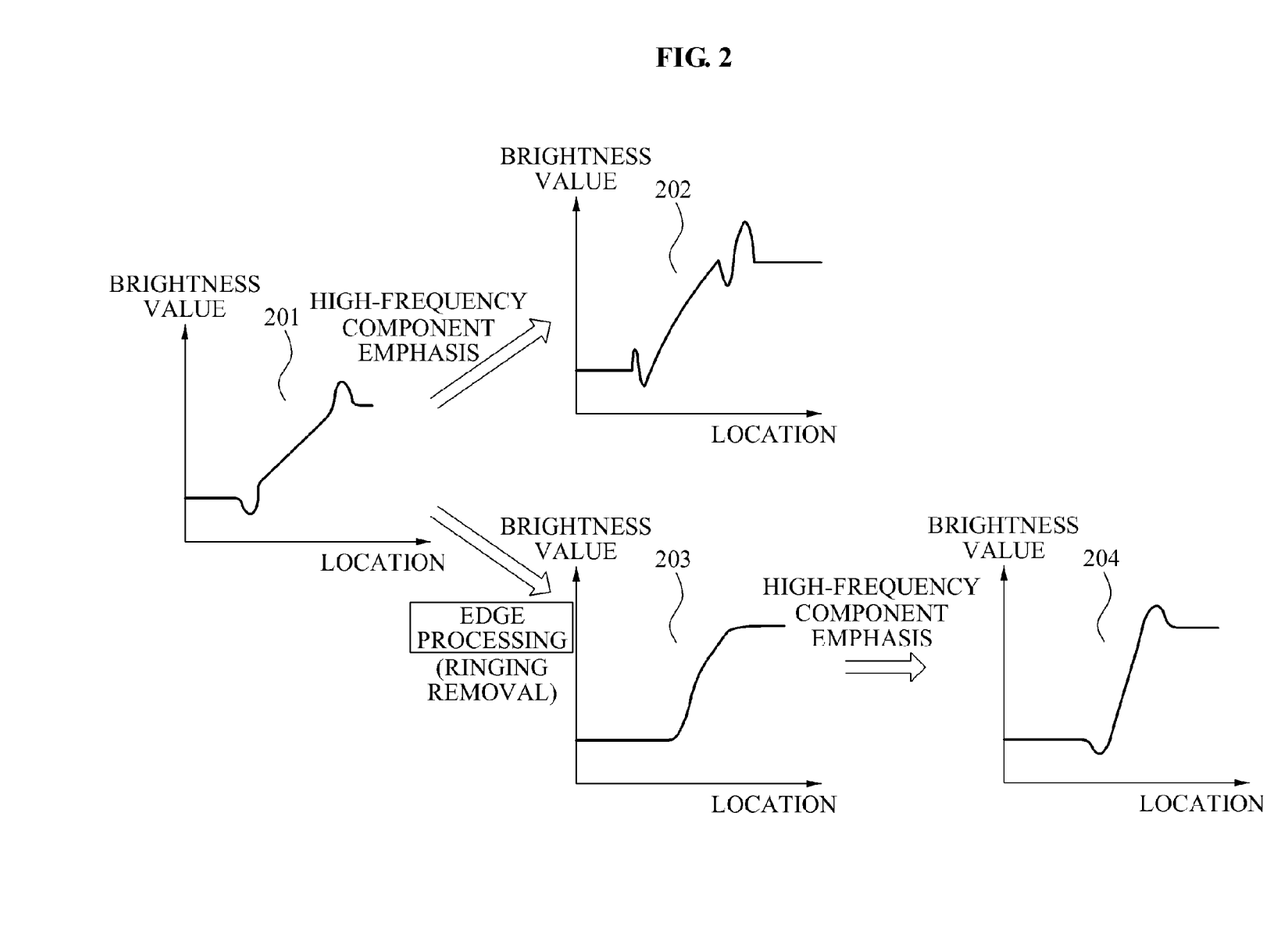
FIG. 2 illustrates an effect of an edge processing when restoring a high frequency component according to an embodiment of the present invention.

FIG. 2 illustrates an effect of an edge processing when restoring a high frequency component according to an embodiment of the present invention. Specifically, FIG. 2 illustrates the effect of the edge processing though comparing effects when emphasizing a high frequency component with respect to an image with a ringing component and an image without the ringing component.

A graph 201 indicates a signal of an image passing the image scaler 102 of FIG. 1. As described above, the since the image scaler 102 enhances an image resolution based on an interpolation, blur can occur in an edge of the image. Accordingly, the ringing component can occur between an object and a background due to the blur in the edge of the image. According to the graph 201, since overshooting occurs in an area having a high brightness value and undershooting occurs in an area having a low brightness value, the ringing component exists in the edge of the image.

A graph 202 indicates an image signal when emphasizing a high frequency component with respect to the image where the ringing component exists in the edge of the image. That is, when emphasizing the high frequency component of the image where the ringing component exists in the edge of the image through an image restoration, the ringing component is emphasized as well. Accordingly, an image quality degradation can be caused as illustrated in the graph 202.

A graph 203 indicates a signal of an image where the ringing component is removed through an edge processing. For example, the edge processing unit 103 processes the edge through a color shifting, and thereby can remove the ringing component. According to the graph 203, overshooting and undershooting indicating the ringing component in the signal do not occur.

A graph 204 indicates an image signal when emphasizing a high frequency component with respect to the edge-processed image. Unlike the graph 202, the graph 204 shows that the image quality degradation does not occur. Also, referring to the graph 204, a difference between the area having the high brightness value and the area having the low brightness value increases, and thus a contrast of the edge of the image is enhanced and a resolution of the edge of the image increases. According to an embodiment of the present invention, when emphasizing the high frequency component with respect to the image where the ringing component is removed by the edge processing, blur in the edge of the image can be removed and the resolution of the image can be enhanced.

Figure 3:
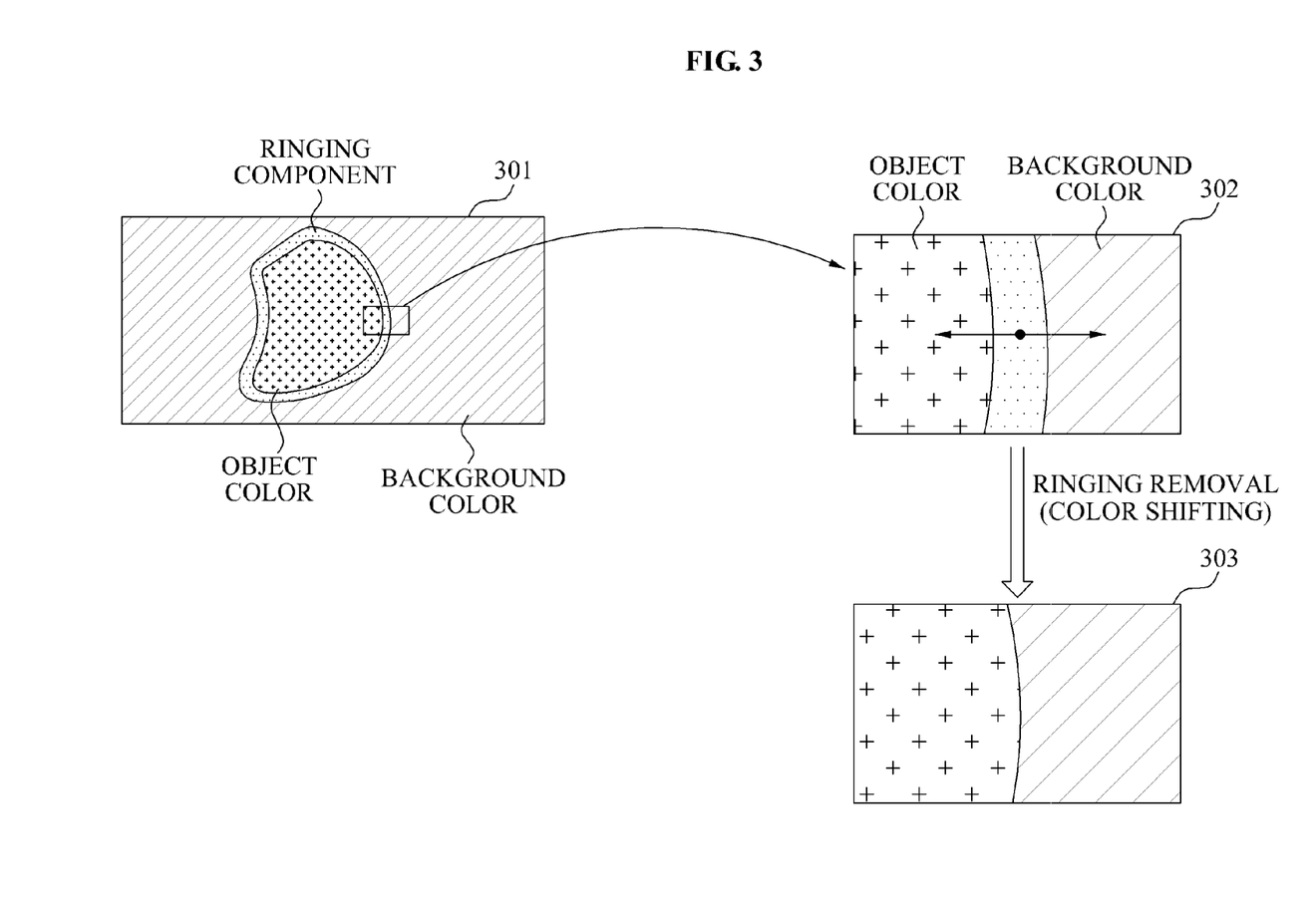
FIG. 3 illustrates an operation of an edge processing unit of the image restoration system of FIG. 1.

FIG. 3 illustrates an operation of the edge processing unit 103 of the image restoration system 101 of FIG. 1. Specifically, FIG. 3 illustrates an operation of removing a ringing component by the edge processing unit 103 of the image restoration system 101.

An image 301 illustrates that a ringing component exists in an edge of an image. As described above, the ringing component indicates blur of the image occurring when enhancing an image resolution by the image scaler 102.

A drawing 302 illustrates processing of the edge through performing a color shifting in the edge by the edge processing unit 103. In this instance, the edge processing unit 103 increases a signal bandwidth of any one of an object color and a background color of the image, and thereby can remove the ringing component of the edge of the image.

That is, since the ringing component exists in both sides of the edge between an object and background, the edge processing unit 103 can remove the ringing component existing in the edge of the image by increasing the signal bandwidth. Then, the ringing component in the edge is removed through the color shifting as illustrated in a drawing 303. When restoring the image after the edge processing which removes the ringing component, a result image where the resolution is enhanced and an amplification of the ringing component is minimized can be obtained.

Figure 4:
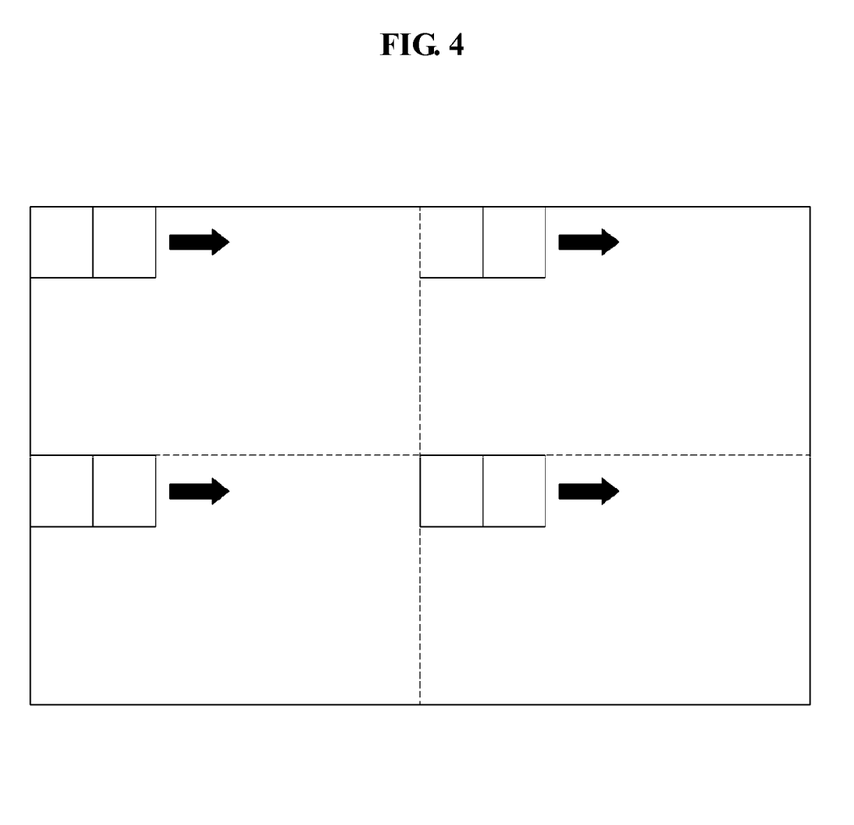
FIG. 4 illustrates an operation of performing a block-based image restoration according to an embodiment of the present invention.

FIG. 4 illustrates an operation of performing a block-based image restoration according to an embodiment of the present invention.

As illustrated in FIG. 4, the restoration parameter extraction unit 104 can segment an image into at least one domain and extract a restoration parameter for each block included in the segmented domain. In this instance, the restoration parameter extraction unit 104 can independently extract the restoration parameter for each of the segmented domains. Also, the image restoration unit 105 can apply a block-based transform domain filtering according to the restoration parameter and perform an image restoration. In this instance, a number of segmented domains is not limited.

For example, since a super high resolution image such as a UD image has a great amount of data, an image restoration with respect to an entire image is complex and inefficient. According to an embodiment of the present invention, the restoration parameter extraction unit 104 and the image restoration unit 105 can perform a block-based image restoration. Referring to FIG. 4, the entire image is segmented into four domains and the restoration parameter is extracted with respect to the blocks included in each of the four domains from left to right to restore the image. An extraction direction of the restoration parameter can be arbitrary.

As described above, however, when the restoration parameter is extracted for each block and a difference of parameters among the blocks is significant, a blocking artifact can occur. Accordingly, the restoration parameter extraction unit 104 can extract the restoration parameter based on global restoration information about the entire image and local restoration information about each of the blocks. Specifically, the restoration parameter extraction unit 104 extracts a restoration parameter using the global restoration information as a guide line, and thereby can prevent an excessive difference of the restoration parameter among the blocks.

Figure 5:
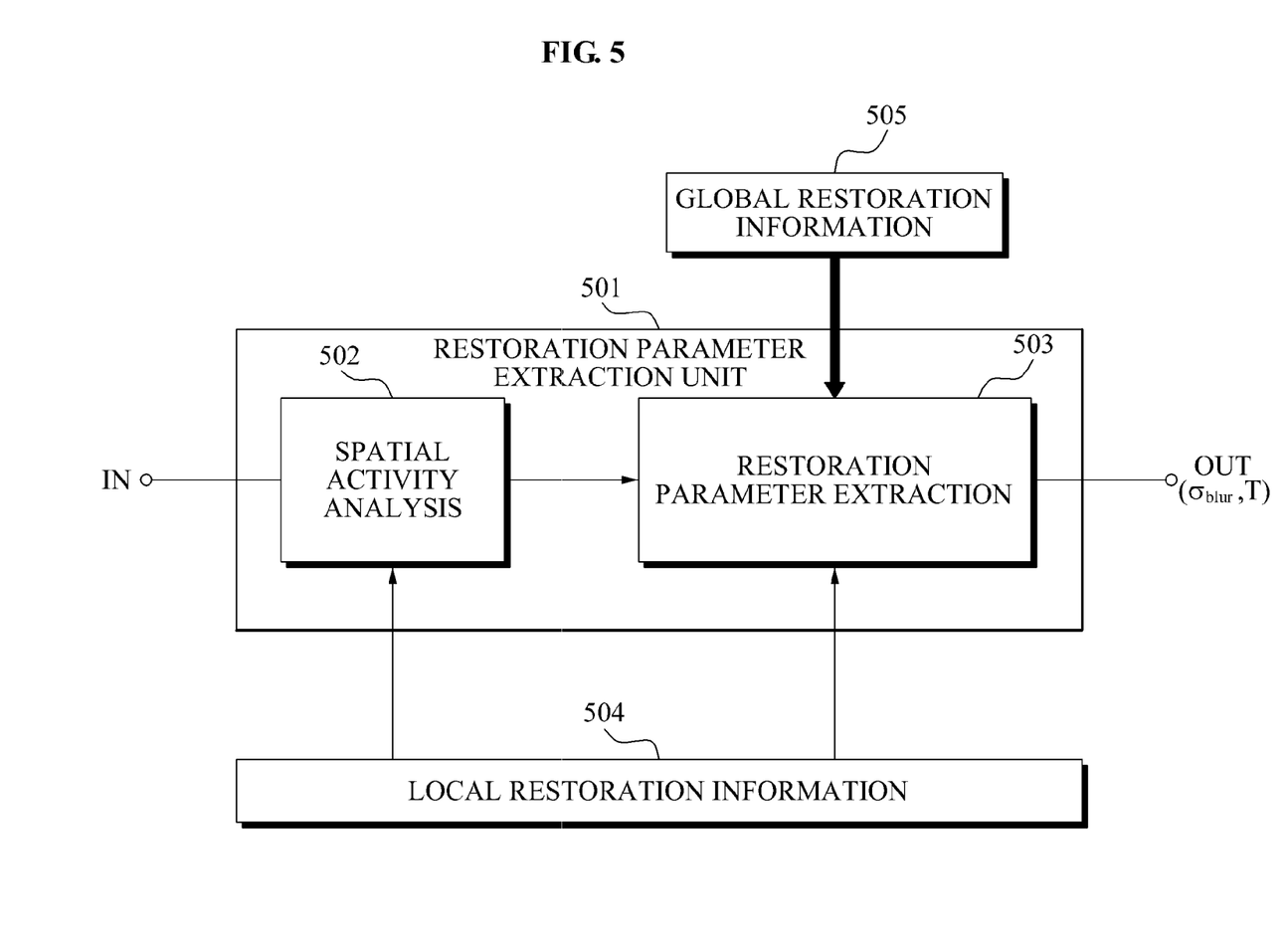
FIG. 5 illustrates an operation of a restoration parameter extraction unit of the image restoration system of FIG. 1.

FIG. 5 illustrates an operation of a restoration parameter extraction unit 501 of the image restoration system 101 of FIG. 1.

As described above, the restoration parameter extraction unit 501 can segment the image into at least one domain and extract a restoration parameter for each block included in the segmented domain. For example, referring to FIG. 5, the restoration parameter extraction unit 501 can perform an operation of spatial activity analysis 502 for each block and an operation of restoration parameter extraction 503. In this instance, the restoration parameter can include a blur value and a noise removal threshold value of each of the blocks. For example, a spatial activity can be represented as Equation 1 below. In this instance, the restoration parameter extraction unit 501 can use a size of each of the blocks included in local restoration information 504.

$$\alpha_k = \Sigma_{k\text{-}th\ block}(|\nabla_x|^2 + |\nabla_y|^2).$$ [Equation 1]

Here, $\nabla_x$ and $\nabla_y$ denote a gradient value to an axis x and an axis y, respectively. K denotes an index of each of the blocks and α denotes a spatial activity of each of the blocks.

The restoration parameter extraction unit 501 independently extracts the restoration parameter for each of the segmented domains considering the local restoration information 504 and global restoration information 505, and thereby can prevent a blocking artifact. The restoration parameter extraction unit 501 can extract a blur value and a noise removal threshold value of each of the blocks considering the local restoration information 504 and the global restoration information 505. The blur value and the noise removal threshold value are the restoration parameter. For example, the blur value and the noise removal threshold value can be represented as Equation 2:

$$\sigma_{blur} = \sigma_{av} + \mu_\sigma \cdot f_\sigma(\alpha - \alpha_{av})$$

$$T = T_{av} - \mu_T \cdot f_T(\alpha - \alpha_{av})$$ [Equation 2]

Here, $\sigma_{av}$ and $T_{av}$ are an average value of the blur value and the noise removal threshold value of each of the blocks, which corresponds to the global restoration information 505. In this instance, the global restoration information 505 can be determined according to magnification information which is applied when enhancing an image resolution by an image scaler 102.

For example, although calculating an average value of spatial activities within a current frame of the image is most accurate, the average value can be calculated within a previous frame when a movement of an object included in the image is not significant for a hardware embodiment.

Also, $\mu_\sigma$ and $\mu_T$ are step-size, and $f_\sigma$ and $f_T$ are arbitrary mapping functions and correspond to the local restoration information 504. Also, α is the spatial activity of each of the blocks and, $\alpha_{av}$ is the average value of spatial activities of the blocks.

For example, a block can be classified as a domain having significant detail of an image as a spatial activity of the block increases, and a block can be classified as a domain having an insignificant detail of an image as a spatial activity of the block decreases. In this instance, the domain having the strong detail is outputted as a clear image as an enhancement of the high frequency component is significant, whereas disadvantages such as a noise boost(amplification of noise) can occur in the domain having the insignificant detail as the enhancement of the high frequency component is significant.

Accordingly, in order to reduce the disadvantages, the restoration parameter extraction unit 501 can extract a larger blur value as the spatial activity increases, and extract a smaller blur value as the spatial activity decreases, as Equation 2. Also, the restoration parameter extraction unit 501 can extract a smaller noise removal threshold value as the spatial activity increases, and extract a larger noise removal threshold value as the spatial activity decreases.

Accordingly, the restoration parameter extraction unit 501 can extract the blur value and the noise removal threshold value of each of the blocks using an analysis result with respect to the spatial activity of each of the blocks. In this instance, the restoration parameter extraction unit 501 can extract the restoration parameter based on the global restoration information 505 about the entire image and the local restoration information 504 about each of the blocks, and thereby can prevent the blocking artifact from occurring.

In this instance, the blur value can indicate convolutions of various blurs such as blur occurring when obtaining an image, and blur occurring when enhancing an image resolution by the image scaler 102. In a case of the convolutions of the various blurs, it can be assumed that the blur value is close to a Gaussian function based on a central limit theorem. For example, the Gaussian function can be represented as Equation 3:

$$h(x, y) = Ke^{-(x^2 + y^2)/(2\sigma^2_{blur})}.$$ [Equation 3]

Here, h(x, y) is a blur value represented in a Gaussian function form. K is a constant to normalize the Gaussian function. $\sigma_{blur}$ denotes a blur value corresponding to the restoration parameter. As $\sigma_{blur}$ increases, the Gaussian function h(x,y) shows diffusion form to all domains. Accordingly, blur of the image is significant. Conversely, as $\sigma_{blur}$ decreases, the Gaussian function h(x,y) shows a centralized form to a particular point. Accordingly, blur of the image is insignificant. For example, $\sigma_{blur}$ of each of the blocks can be predicted using noise of a current block and noise of a previous block.

Figure 6:
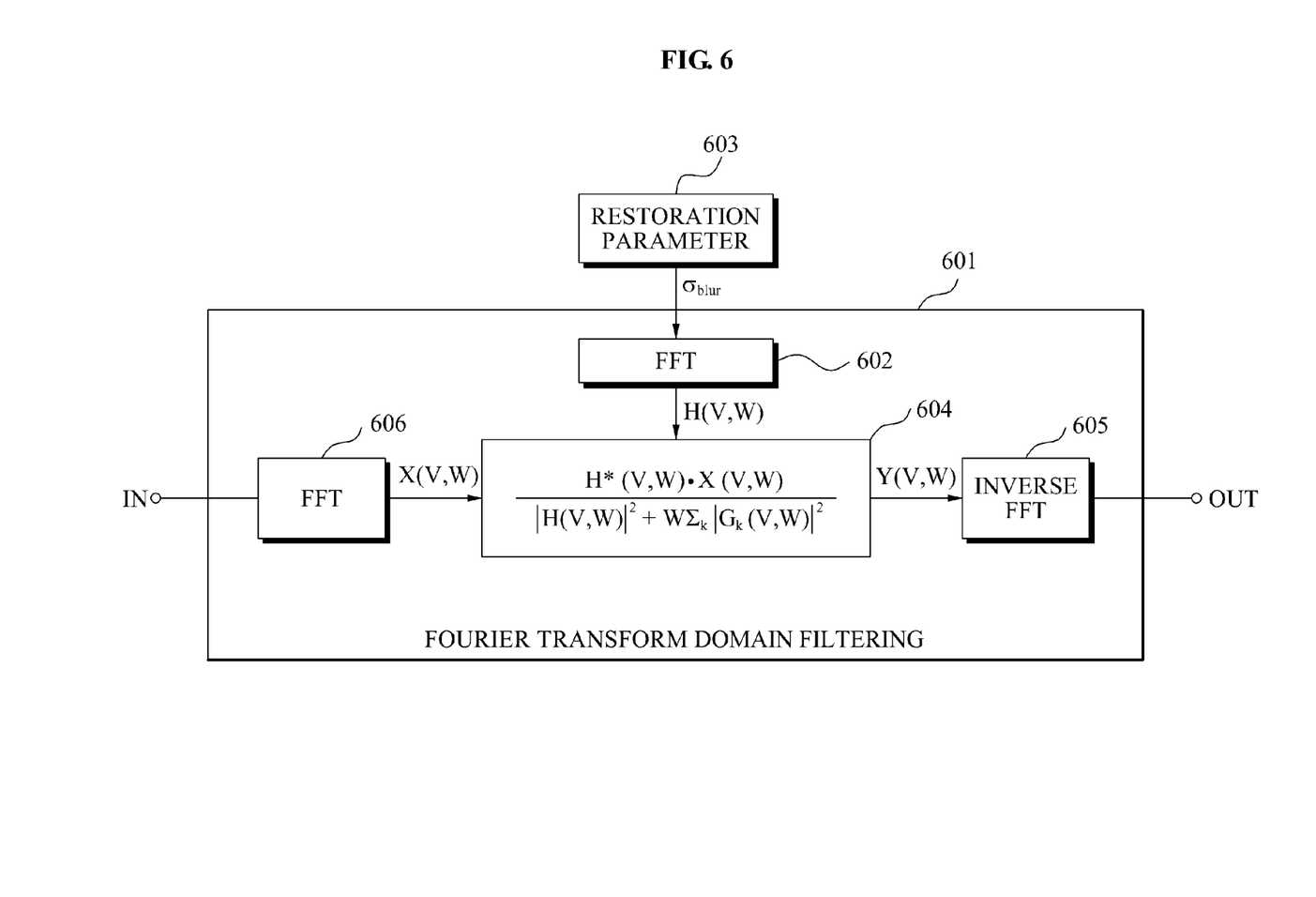
FIG. 6 illustrates an operation of a Fourier transform domain filtering performed by an image restoration unit of the image restoration system according to an embodiment of the present invention.

FIG. 6 illustrates an operation of a Fourier transform domain filtering 601 performed by the image restoration unit 105 of the image restoration system 101 of FIG. 1.

For example, the image restoration unit 105 can apply the Fourier transform domain filtering 601 with respect to each block using a restoration parameter 603. In this instance, the Fourier transform domain filtering 601 can use a blur value $\sigma_{blur}$ of the restoration parameter 603. The Fourier transform domain filtering 601 can perform a Fourier transform 602 of an input image and perform the Fourier transform 602 of the blur value which is the restoration parameter 603.

As illustrated in FIG. 6, a filtering image Y(v,w) 604 can be determined using the Fourier transformed input image X(v,w) and the Fourier transformed blur value H(v,w). For example, the image restoration unit 105 can determine the filtering image Y(v,w) 604 using Equation 4:

$$Y(v, w) = \frac{H^*(v, w)X(v, w)}{|H(v, w)|^2 + w\sum_k |G_k(v, w)|^2}.$$ [Equation 4]

Here, v and w denote a location of blocks, and G denotes a function for normalization. Referring to Equation 4, in a case of a high frequency, a denominator is great, and thus an effect of an inverse Fourier transform 605 is reduced. Accordingly, when performing the inverse Fourier transform 605 of the filtering image Y(v, w) 604, an excessive emphasis of the high frequency can be prevented. Equation 4 is simply an example, and can vary according to a system configuration.

Figure 7:
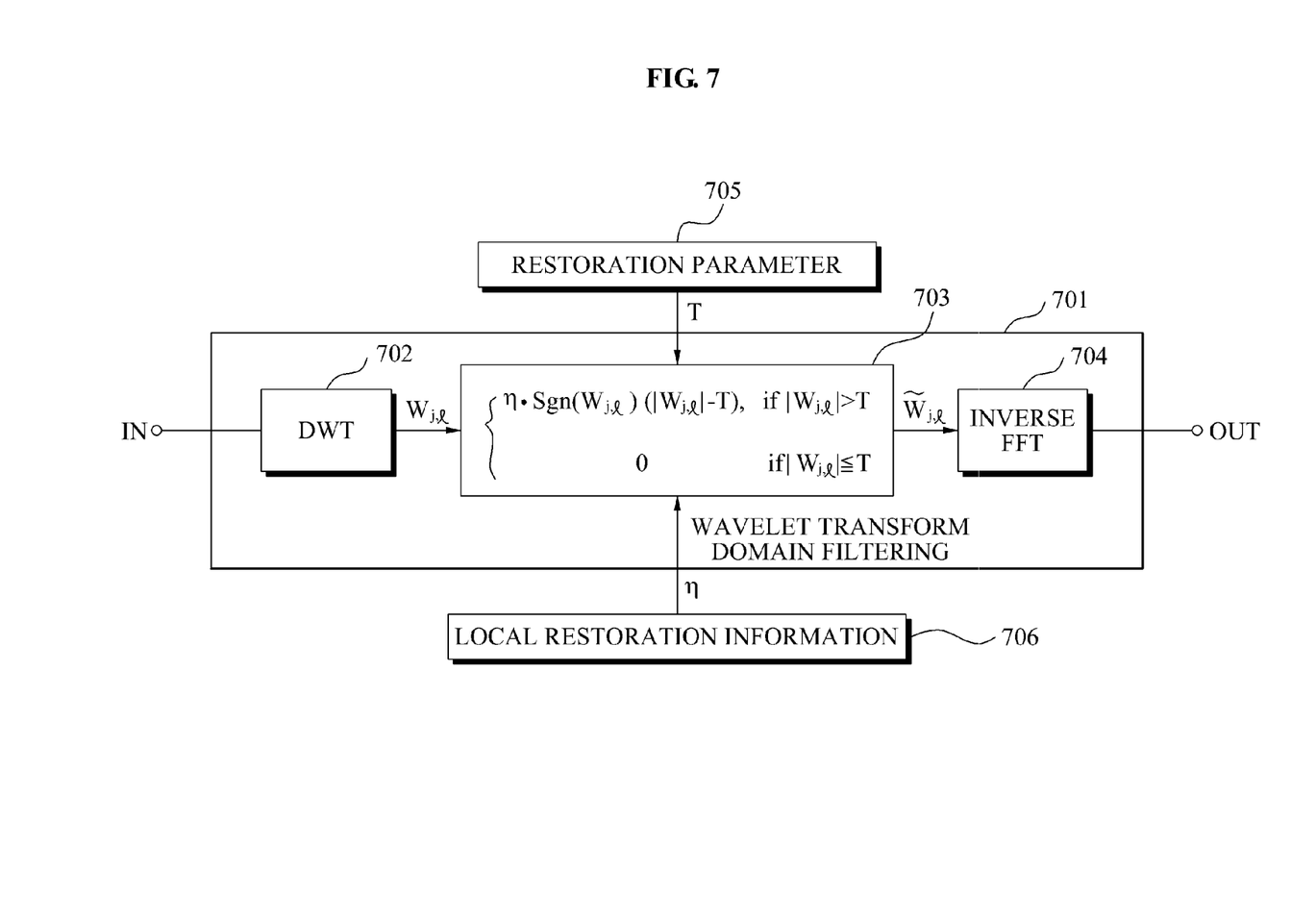
FIG. 7 illustrates an operation of a wavelet transform domain filtering performed by an image restoration unit of an image restoration system according to an embodiment of the present invention.

FIG. 7 illustrates an operation of a wavelet transform domain filtering 701 performed by the image restoration unit 105 of the image restoration system 101 of FIG. 1.

For example, the image restoration unit 105 can apply the wavelet transform domain filtering 701 with respect to each block using a restoration parameter 705. For example, the image restoration unit 105 can apply the wavelet transform domain filtering 701 after a Fourier transform domain filtering with respect to each of the blocks is finished. However, the image restoration unit 105 can apply the Fourier transform domain filtering using a blur value and the wavelet transform domain filtering 701 using a noise removal threshold value in parallel considering a filtering process for each segmented domain.

In this instance, the wavelet transform domain filtering 701 can use the noise removal threshold value T of a restoration parameter 705. As illustrated in FIG. 7, a filtering image $\tilde{w}_{j,l}$ 703 can be determined using the noise removal threshold value T which is the restoration parameter 705 and the wavelet transformed input image $w_{j,l}$ 702 which is the output of DWT(Discrete Wavelet Transform) 702. For example, the image restoration unit 105 can determine the filtering image $\tilde{w}_{j,l}$ 703 using Equation 5:

$$\tilde{w}_{j,l} = \begin{cases} \eta \cdot \text{sgn}(w_{j,l})(|w_{j,l}| - T), & \text{if } |w_{j,l}| > T \\ 0, & \text{if } |w_{j,l}| \leq T \end{cases}. \quad [\text{Equation 5}]$$

The image restoration unit 105 controls a wavelet coefficient η of the wavelet transform domain filtering 701, and thus a noise boost (amplification of noise) occurring in the Fourier transform domain filtering is removed and an image resolution can be enhanced. In this instance, the wavelet coefficient η is included in local restoration information 706. Since the wavelet transform domain filtering 701 can represent a feature point of a signal, for example, an edge of an image, the wavelet transform domain filtering 701 is efficient for noise removal and resolution enhancement. In this instance, when the image is determined as noise, $|w_{j,l}| \leq T$, the image restoration unit 105 determines the filtering image $\tilde{w}_{j,l}$ 703 as 0, and removes the noise. When the image is determined as a signal component, $|w_{j,l}| > T$, the image restoration unit 105 scales the filtering image $\tilde{w}_{j,l}$ 703 though the wavelet coefficient η and thereby can enhance the image resolution. In this instance, the wavelet coefficient η can be greater than 1. When the filtering image $\tilde{w}_{j,l}$ 703 is determined, the noise can be removed through an inverse wavelet transform 704 and a resolution-enhanced image can be obtained.

Figure 8:
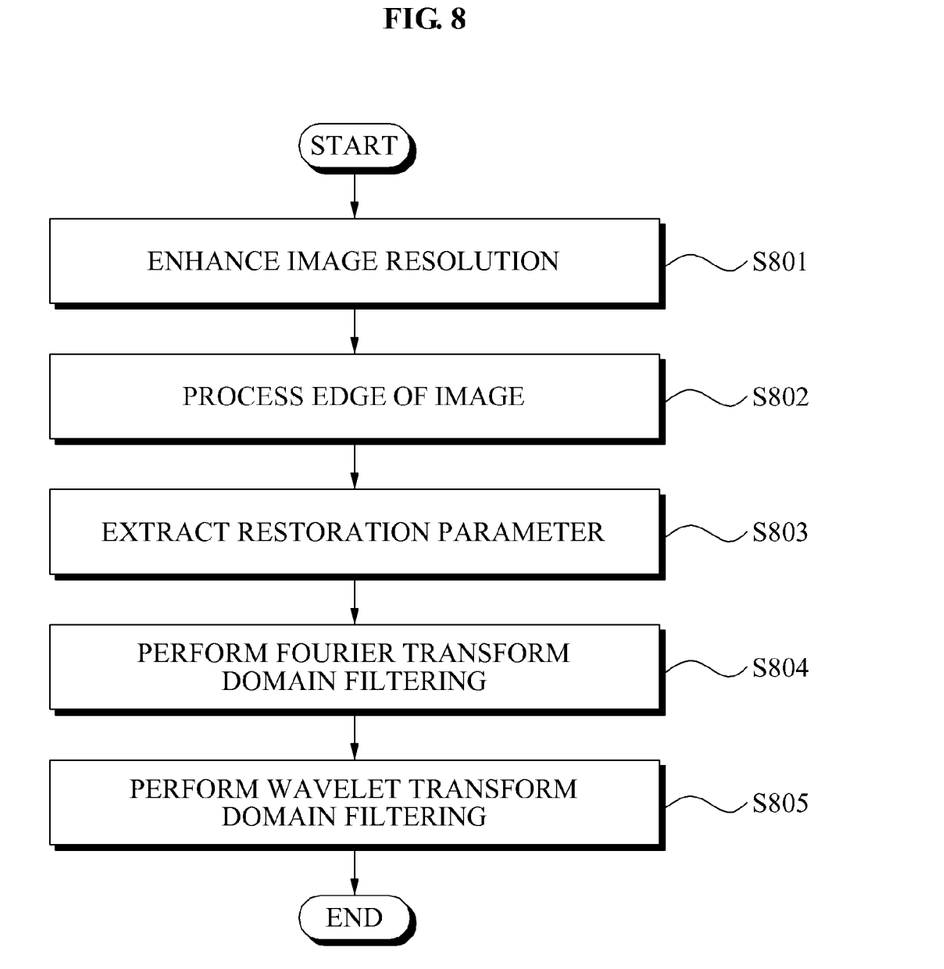
FIG. 8 illustrates an image restoration method according to an embodiment of the present invention.

FIG. 8 illustrates an image restoration method according to an embodiment of the present invention.

In operation S801, the image restoration method upsamples an image, interpolates the upsampled image, and enhances a resolution of the image.

In this instance, the enhancing in operation S801 can upsample the image using zero data, and interpolate the upsampled image through a low-pass filter.

In operation S802, the image restoration method performs a color shifting in an edge of the image and processes the edge of the image.

In this instance, the processing in operation S802 can process an edge of the resolution-enhanced image. Also, the processing in operation S802 increases a signal bandwidth of any one of an object color and a background color of the image, and thereby can remove a ringing component of the edge of the image.

In operation S803, the image restoration method segments the image into at least one domain and extracts a restoration parameter for each block included in the segmented domain.

In this instance, the extracting in operation S803 can extract a blur value and a noise removal threshold value of each of the blocks using an analysis result with respect to a spatial activity of each of the blocks.

Specifically, the extracting in operation S803 can extract a larger blur value as the spatial activity with respect to each of the blocks increases, and extract a smaller blur value as the spatial activity with respect to each of the blocks decreases. Also, the extracting in operation S803 can extract a smaller noise removal threshold value as the spatial activity with respect to each of the blocks increases, and extract a larger noise removal threshold value as the spatial activity with respect to each of the blocks decreases.

In this instance, the extracting in operation S803 can extract the restoration parameter based on global restoration information about an entire image and local restoration information about each of the blocks.

The image restoration method applies a block-based transform domain filtering according to the restoration parameter and performs an image restoration. In this instance, the performing of the image restoration can apply a Fourier transform domain filtering in operation S804 and a wavelet transform domain filtering in operation S805 with respect to each of the blocks using the restoration parameter.

In this instance, the performing of the image restoration can apply the Fourier transform domain filtering using the blur value and the wavelet transform domain filtering using the noise removal threshold value in parallel considering a filtering process for each segmented domain.

The above-described example embodiments of the present invention may be recorded in a computer-readable media including program instructions to implement various operations embodied by a computer. The media may also include, alone or in combination with the program instructions, data files, data structures, and the like. The media and program instructions may be those specially designed and constructed for the purposes the example embodiment of the present invention, or they may be of the kind well-known and available to those having skill in the computer software arts. Examples of computer-readable media include magnetic media such as hard disks, floppy disks, and magnetic tape, optical media, for example, CD ROM disks and DVD, magneto-optical media, for example, optical disks, and hardware devices that may be specially configured to store and perform program instructions, for example, read-only memory (ROM), random access memory (RAM), flash memory, and the like. Examples of program instructions include both machine code, for example, produced by a compiler, and files containing higher level code that may be executed by the computer using an interpreter. The described hardware devices may be configured to act as one or more software modules in order to perform the operations of the above-described example embodiments of the present invention.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. An image restoration system, comprising:
    an edge processing unit to perform a color shifting in an edge of an image and process the edge of the image;
    a restoration parameter extraction unit to segment the image into at least one domain and extract a restoration parameter for each block included in the segmented domain; and
    an image restoration unit to apply a block-based transform domain filtering according to the restoration parameter and perform an image restoration.

2. The image restoration system of claim 1, further comprising:
    an image scaler to upsample the image, interpolate the upsampled image, and enhance a resolution of the image, wherein the edge processing unit processes an edge of the resolution-enhanced image.

3. The image restoration system of claim 2, wherein the image scaler upsamples the image using zero data, and interpolates the upsampled image through a low-pass filter.

4. The image restoration system of claim 1, wherein the edge processing unit increases a signal bandwidth of any one of an object color and a background color of the image and removes a ringing component of the edge of the image.

5. The image restoration system of claim 1, wherein the restoration parameter extraction unit extracts a blur value and a noise removal threshold value of each of the blocks using an analysis result with respect to a spatial activity of each of the blocks.

6. The image restoration system of claim 5, wherein the restoration parameter extraction unit extracts a larger blur value as the spatial activity increases, and extracts a smaller blur value as the spatial activity decreases.

7. The image restoration system of claim 5, wherein the restoration parameter extraction unit extracts a smaller noise removal threshold value as the spatial activity increases, and extracts a larger noise removal threshold value as the spatial activity decreases.

8. The image restoration system of claim 1, wherein the restoration parameter extraction unit extracts the restoration parameter based on global restoration information about the entire image and local restoration information about each of the blocks.

9. The image restoration system of claim 1, wherein the image restoration unit applies a Fourier transform domain filtering and a wavelet transform domain filtering of each of the blocks using the restoration parameter.

10. The image restoration system of claim 9, wherein the image restoration unit applies the Fourier transform domain filtering and the wavelet transform domain filtering in parallel considering a filtering process for each segmented domain, the Fourier transform domain filtering using the blur value and the wavelet transform domain filtering using the noise removal threshold value.

11. An image restoration method, comprising:
   performing a color shifting in an edge of an image and processing the edge of the image;
   segmenting the image into at least one domain and extracting a restoration parameter for each block included in the segmented domain; and
   applying a block-based transform domain filtering according to the restoration parameter and performing an image restoration.

12. The image restoration method of claim 11, further comprising:
   upsampling the image, interpolating the upsampled image, and enhancing a resolution of the image,
   wherein the processing processes an edge of the resolution-enhanced image.

13. The image restoration method of claim 12, wherein the enhancing upsamples the image using zero data, and interpolates the upsampled image through a low-pass filter.

14. The image restoration method of claim 11, wherein the processing increases a signal bandwidth of any one of an object color and a background color of the image and removes a ringing component of the edge of the image.

15. The image restoration method of claim 11, wherein the extracting extracts a blur value and a noise removal threshold value of each of the blocks using an analysis result with respect to a spatial activity of each of the blocks.

16. The image restoration method of claim 15, wherein the extracting extracts a larger blur value as the spatial activity with respect to each of the blocks increases, and extracts a smaller blur value as the spatial activity with respect to each of the blocks decreases.

17. The image restoration method of claim 15, wherein the extracting extracts a smaller noise removal threshold value as the spatial activity with respect to each of the blocks increases, and extracts a larger noise removal threshold value as the spatial activity with respect to each of the blocks decreases.

18. The image restoration method of claim 11, wherein the extracting extracts the restoration parameter based on global restoration information about the entire image and local restoration information about each of the blocks.

19. The image restoration method of claim 11, wherein the performing of the image restoration applies a Fourier transform domain filtering and a wavelet transform domain filtering of each of the blocks using the restoration parameter.

20. The image restoration method of claim 19, wherein the performing of the image restoration applies the Fourier transform domain filtering and the wavelet transform domain filtering in parallel considering a filtering process for each segmented domain, the Fourier transform domain filtering using the blur value and the wavelet transform domain filtering using the noise removal threshold value.

21. A non-transitory computer-readable recording medium storing a program for implementing an image restoration method, comprising:
   performing a color shifting in an edge of an image and processing the edge of the image;
   segmenting the image into at least one domain and extracting a restoration parameter for each block included in the segmented domain; and
   applying a block-based transform domain filtering according to the restoration parameter and performing an image restoration.

* * * * *